UNITED STATES PATENT OFFICE.

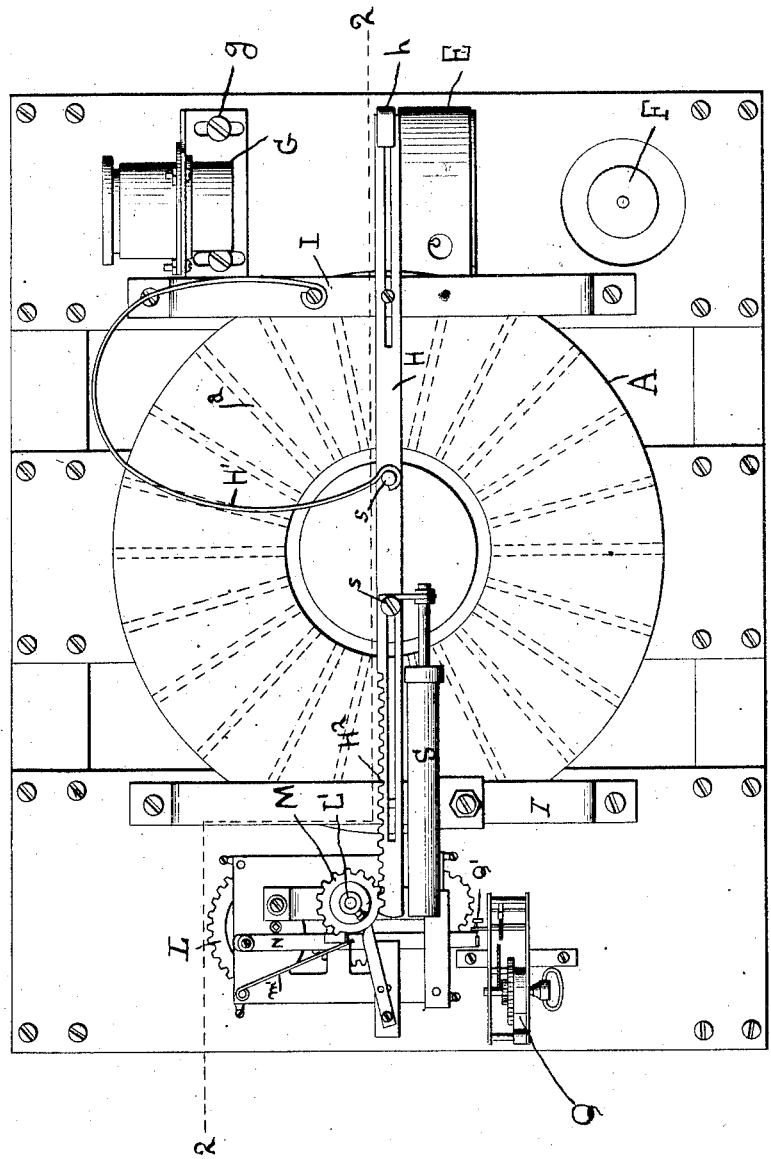

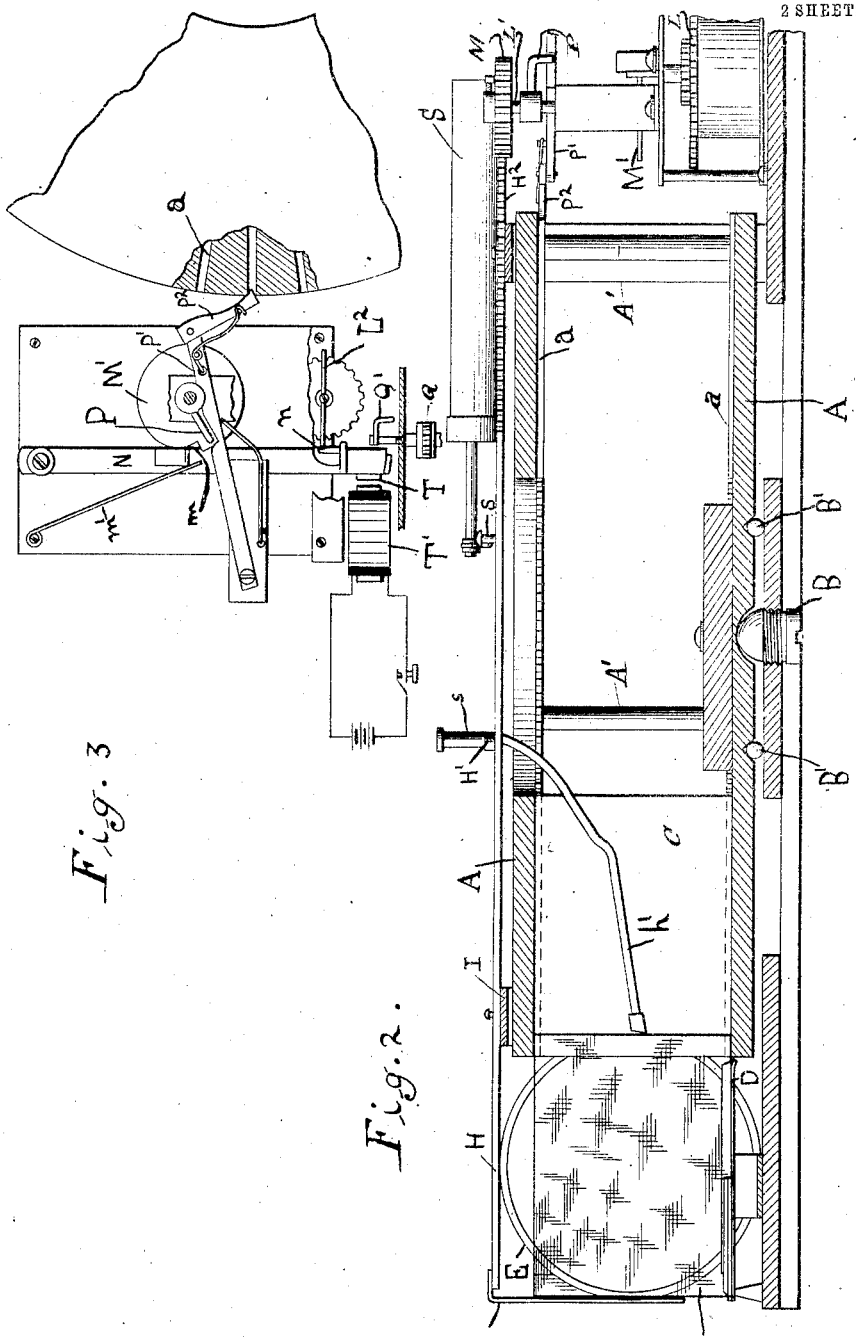

GEORGE M. GUERRANT, OF DANVILLE, VIRGINIA, ASSIGNOR OF ONE-HALF TO THOMAS L. SYDNOR, OF DANVILLE, VIRGINIA.

AUTOMATIC PICTURE-EXHIBITING APPARATUS.

No. 926,839.   Specification of Letters Patent.   Patented July 6, 1909.

Application filed February 13, 1909. Serial No. 477,681.

*To all whom it may concern:*

Be it known that I, GEORGE M. GUERRANT, a citizen of the United States, residing at Danville, Pittsylvania county, Virginia, have invented certain new and useful Improvements in Automatic Picture-Exhibiting Apparatus; and I do hereby declare the following to be a full, clear, and exact description of the same, reference being had to the accompanying drawings, forming a part of this specification, and to the figures and letters of reference marked thereon.

This invention relates to improvements in automatic picture projecting or exhibiting devices, the objects being to provide efficient mechanical means for successively presenting a series of pictures in the field of the projecting lens or in the field of observation.

The invention consists in certain novel details of construction and combinations and arrangements of parts, all as will be now described and pointed out particularly in the appended claims.

In the accompanying drawings: Figure 1 is a top plan view of the working parts of an apparatus embodying the present improvements. Fig. 2 is a section in a vertical plane on substantially the line 2—2, Fig. 1. Fig. 3 is a detail view on an enlarged scale showing particularly the intermittent feed mechanism for the carrier and a supplemental electrically controlled releasing mechanism.

Like characters of reference in the several figures indicate the same parts.

In the apparatus of the present invention a rotary carrier mounted on a vertical axis and having a series of radially arranged holders or guideways for the picture slides is employed in connection with mechanism for successively moving the pictures radially into the field of observation or field of the projecting lenses.

The carrier is preferably formed by circular top and bottom plates A connected by posts A' and mounted on a central axis or journal screw B and an annular bearing such as the ball bearing B' for holding the parts in correct level position. The proximate faces of the plates are provided with radial grooves a forming the radial holders or guideways for the picture slides C.

At one point in the rotation of the carrier each holder or guideway is brought into alinement with a fixed guide D of proper form to receive and support the picture slide when projected from the carrier. This fixed guide intersects the lens or view field, thus as shown a light concentrating lens E is located between the fixed guide and a light F, and on the opposite side of the fixed guide is a projecting lens G adjustably mounted on the base by screws g.

Each picture slide when brought into alinement with the fixed guide is adapted to be positively moved, as shown in Fig. 2, and again positively drawn back into the carrier by a reciprocatory carriage formed by a bar H mounted to slide longitudinally on bridges I and having a front projection h for engaging the outer edges of the slides and a forwardly projecting arm h' for engaging the inner edges of the slides. The arm h' extends through a central opening of the top plate of the carrier and is of sufficient length to pass between the plates in advancing the slides to their projected position.

The reciprocatory carriage is preferably retracted by a spring H', but is advanced to project a slide and hold the same projected for a determined time by a spring motor L having a power shaft L' carrying a mutilated gear M meshing with a rack H² on the carriage H. A fan governor L² controls the speed at which the spring motor may run, and also forms a convenient part with which the stop projection n on the control lever N may engage to arrest the movement of the motor.

A cam M' on the power shaft below the mutilated gear serves to hold the control lever N out of engagement with the fan during the running period of the motor, while a notch or recess m permits the lever to advance under the influence of its spring m' into position to stop the motor at the proper point in the rotation of the shaft.

In addition to the mutilated gear and cam, the power shaft carries a feed arm or projection P for advancing the carrier step by step. The arm or projection P engages a lever P', carrying a spring pressed pawl P² adapted to engage teeth or notches, preferably the end walls of the slots forming the slideways in the upper plate of the carrier, as shown clearly in Fig. 3.

The relative arrangement of the mutilated gear, cam M' and feed projection P, and the coöperating parts is such that when the stop lever is permitted to advance by entering the notch in the cam M' to engage the fan and arrest the motor, the mutilated gear has advanced the carriage to the position shown in Fig. 1 with a slide projected, and the feed projection a short distance away from its co-operating lever. If the control lever be now tripped or moved back out of engagement with the fan, as by a clock train Q and projection Q' on the minute hand thereof, the spring motor will start. The first movement of the shaft rotates the mutilated gear out of mesh with the rack H², which latter, together with the carriage and slide, instantly moves back under the influence of the spring H'. During the time the space in the mutilated gear is passing the rack, the feed arm engages its lever and advances the carrier the distance between adjacent slides, then the mutilated gear again engages the rack bar and advances the carriage together with the new slide which has been brought into position by the movement of the carrier, and finally, just as the parts reach the first position the cam M' permits the stop lever to again engage the fan and stop the motor. In order to bring the carriage to rest without undue shock a dash pot or air check S is connected with the carriage or is adapted to be operated by projections s thereon, as will be readily understood.

While a clock train is preferably employed to release the spring motor periodically, say once a minute, it may be desirable in some instances to control the same from a distance and hence, as shown in Fig. 3, I prefer to mount an armature T on the control lever in position to be drawn toward an electro-magnet T' for releasing the lever, and the magnet may be energized by a circuit adapted to be established or broken at any convenient point and either manually or by well known automatic means.

Having thus described the invention, what I claim as new and desire to secure by Letters-Patent, is:

1. In an automatic picture exhibiting device, the combination with a rotary carrier journaled on a vertical axis and having radial guides for picture slides, of a reciprocatory carriage, motor mechanism for reciprocating said carriage and moving the carrier step by step, and projections embracing the picture slides for positively projecting the same beyond the carrier and returning them to normal position in the carrier.

2. In an automatic picture exhibiting device, the combination with a horizontally arranged rotary carrier journaled on a vertical axis and having horizontal radial guides for picture slides, of a reciprocatory carriage movable radially of said carrier and having projections adapted to engage opposite edges of the picture slides for moving the latter positively in both directions, motor mechanism for reciprocating said carriage and moving the carrier step by step to bring the picture slides successively into position to be moved by the carriage.

3. In an automatic picture exhibiting device, the combination with a horizontally arranged carrier journaled on a vertical axis and having radial picture slide guideways, of a carriage having projections between which the picture slides are brought by the rotation of the carrier, and a motor mechanism for reciprocating the carriage embodying a rack bar and a motor driven mutilated gear and a carrier feed mechanism operated to feed the carrier while the gear is out of mesh with the rack bar.

4. In an automatic picture exhibiting apparatus, the combination with a rotary carrier having radially arranged picture slide guides, of a reciprocatory carriage having projections between which the slides are brought by the rotation of the carrier, a rack bar connected with the carriage, a motor driven mutilated gear adapted to mesh with the rack bar and a spring for moving the carriage in opposition to the movement imparted by the gear.

5. In an automatic picture exhibiting apparatus, the combination with a rotary carrier having radially arranged picture slide guides, of a reciprocatory carriage having projections between which the slides are brought by the rotation of the carrier, a rack bar connected with the carriage, a spring for moving the carriage and rack bar in one direction, a motor driven mutilated gear coöperating with the rack bar to move the carriage in the other direction, and a feed mechanism for the carrier moving in unison with the mutilated gear and operative when the latter is out of mesh with the rack bar.

6. In a picture exhibiting apparatus, the combination with a rotary carrier having radially arranged picture slide guides, a reciprocatory carriage having projections between which the picture slides are brought by the rotation of the carrier, and having a toothed rack connected therewith, of a motor embodying a power shaft provided with a mutilated gear adapted to mesh with the rack, a feeding projection for advancing the carrier step by step, and a stop lever controlling cam, a stop lever for arresting the motor, coöperating with said cam and means for moving the lever to permit the movement of the motor.

7. In a picture exhibiting device, the combination with a rotary carrier having radial picture slide guides and a central opening, of a reciprocatory carriage having a projection extending into said central opening to engage the inner edges of the slides, and a projection extending beyond the periphery of the carrier to engage the outer edges of the slides, and motor mechanism for alternately reciprocating the carriage and advancing the carrier step by step.

8. In a picture exhibiting apparatus, the combination with a rotary carrier having radial picture slide guides and a reciprocatory carriage having projections for projecting and retracting the slides, of a spring motor having an intermittently acting mechanism for reciprocating the carriage and advancing the carrier, a stop lever for said motor and a clock train having a projection coöperating periodically with said lever to release the motor.

GEORGE M. GUERRANT.

Witnesses:
   A. C. EDMUNDS,
   MARGUERITE MASSIE.